July 2, 1968          H. A. RASCHKE          3,390,514
DISTRIBUTION AND CONTROL MANIFOLD FOR AIR PURIFYING APPARATUS
Filed Dec. 7, 1966
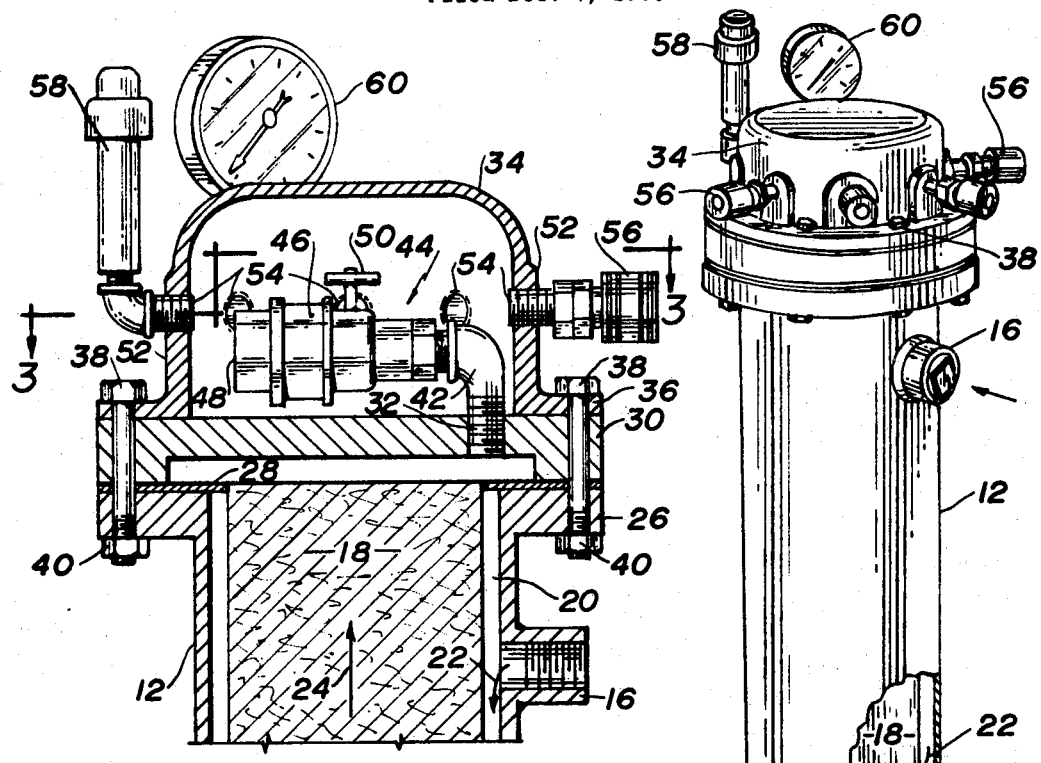
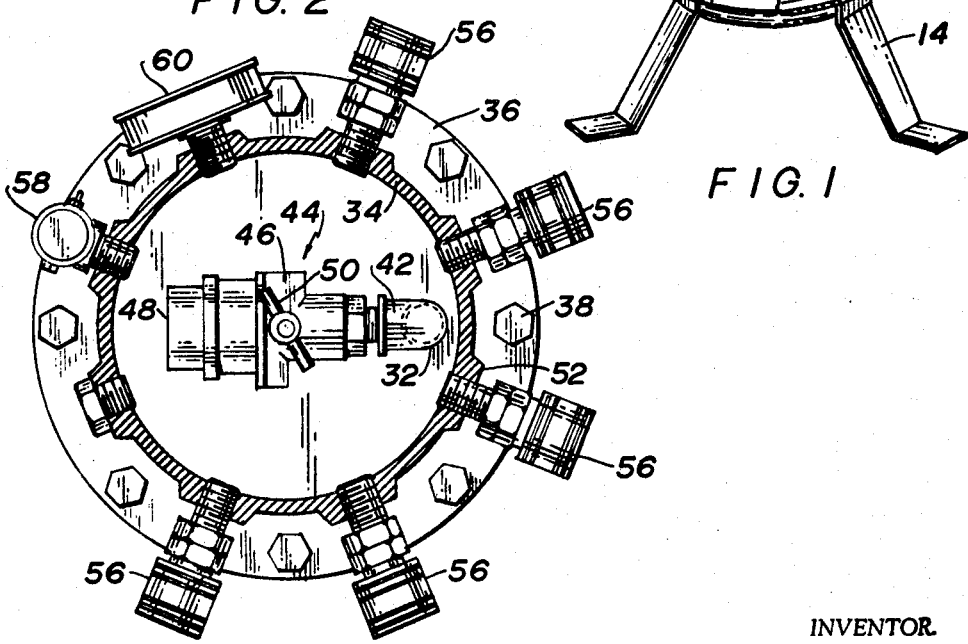
INVENTOR.
HERBERT A. RASCHKE
BY
Townsend and Townsend
ATTORNEYS United States Patent Office 3,390,514
Patented July 2, 1968

3,390,514
DISTRIBUTION AND CONTROL MANIFOLD
FOR AIR PURIFYING APPARATUS
Herbert A. Raschke, Greenbrae, Calif., assignor to
E. D. Bullard Company, Sausalito, Calif.
Filed Dec. 7, 1966, Ser. No. 599,919
2 Claims. (Cl. 55—270)

ABSTRACT OF THE DISCLOSURE

For illustrating without limiting the present invention, there is disclosed hereinafter in conjunction with an air filtering tank, a dome structure which encloses one end of the tank, and which has plural fittings for distributing air that has been purified by passage through the filter tank. Intermediate the air tank and the dome interior is a pressure regulating valve for regulating the pressure delivered from the tank into the dome. The valve is totally enclosed within the dome so as to protect the valve from physical damage and from unauthorized tampering.

Background of the invention

The invention relates to the art of air purification and distribution, and more particularly to an air purifier that removes deleterious substances from air to render the air fit for breathing. The purified air is typically supplied through hoses to hoods or masks adapted for wear by workmen in a contaminated atmosphere. Safety regulations concerning such air supply systems specify the pressure and volume at which such air must be delivered; the present invention provides a manifold structure that assures compliance with such regulations.

Known prior art structures for performing the function accomplished by the present invention include an arrangement of conventioal pipe fittings, which fittings are subject to damage, are cumbersome, and are subject to unauthorized tampering. Unauthorized tampering in known prior art devices is possible because all control valves are mounted exteriorly of the structure, and such tampering is likely to cause dangerously high or low pressures and air delivery rates.

Summary of the invention

The present invention provides for mounting at one end of a cylindric air purifying tank a hollow dome structure. The interior of the dome is sufficiently large to house a pressure regulating valve which regulates the pressure of air from the cylindric tank to the dome interior. Since the dome is secured to the tank by a plurality of bolts, access to the pressure regulating valve by unauthorized persons is rendered extremely inconvenient. The dome is so formed that it easily accommodates a plurality of air fittings circumferentially spaced therearound so as to afford connection of one or more air hoses to the apparatus. Also mounted on the dome is a pressure release valve that discharges air from the dome to the surrounding atmosphere if the pressure in the dome reaches an excessive magnitude.

An object of the present invention is to provide a distribution manifold for air purifiers which guards against unauthorized tampering such as would permit operation of the air supply system at hazardous pressure and delivery rates. This object is achieved by forming the manifold in a dome shape with an interior volume sufficiently large to house a pressure regulating valve.

Another object of the invention is to provide an air distribtuion manifold of compact construction. This object is achieved by providing a dome shaped manifold with plural air outlet fittings circumferentially spaced therearound.

A feature and advantage of the present invention is that the dome and its accouterments form a closure for one end of an air purifying tank so that when it becomes necessary to change the filter medium in the tank, simple removal of the dome affords ready access to the tank interior. Such dome structure is to be contrasted with prior art structures in which one end of the air filter tank is formed by a flat plate to which is attached a maze of pipe fittings which are so cumbersome as to render difficult removal of the plate.

Brief description of the drawing

For affording a more complete understanding of the invention and fuller understanding of the above and other features, advantages, and objects thereof, the accompanying drawing depicts a preferred embodiment of the invention. In the drawing:

FIGURE 1 is an elevational view of a purifying tank having installed thereon a manifold according to the present invention;

FIGURE 2 is a partial cross section elevational view at enlarged scale of the distribution manifold of the present invention installed on a tank; and FIGURE 3 is a plan view in cross section taken along line 3—3 of FIGURE 2.

Description of the preferred embodiment

Referring more particularly to the drawing, reference numeral 12 indicates a tank of generally cylindric form, which is typically supported in a vertical position by a suitable base that includes legs 14. The tank is provided with an inlet fitting 16, which in operation typically communicates with the outlet of an air compressor of suitable capacity. Within the tank 12 is a filter medium 18, which is conventionally provided in cartridge form so shaped to define an annular space 20 intermediate the outer diameter of the filter medium and the inner diameter of tank 12. Thus, air entering inlet fitting 16 travels downwardly as indicated by arrow 22 to the bottom of tank 12 and then upwardly through the filter medium, as at 24. When the air egresses from the top of the filter medium 18, it is suitable for breathing.

A flange 26 is formed around the top of tank 12 and supports, among other things, a rigid ring 28 with which filter medium 18 is integral. According to the present invention, a rigid circular plate 30 is provided, the plate having a diameter substantially equal to the diameter of flange 26. The plate defines an aperture 32 which, when the apparatus is in the assembled condition as depicted in the drawing, constitutes the sole air passage between the interior of tank 12 and the region thereabove.

A hollow dome 34 is provided for enclosing the end of the tank. The dome is formed of air impervious material, such as cast iron, and has a flange base 36 that has an outer diameter approximately equal to the outer diameter of tank flange 26. Flanges 36 and 26, as well as ring 28 and plate 30, are formed with equi-spaced complementary holes for receiving bolts 38 therethrough to retain the apparatus in assembled condition as shown. Nuts 40 are engaged on the bolts for retaining dome 34 onto tank 12 and suitable gaskets, not shown, are typically provided to form an airtight structure.

Threadedly engaged in hole 32 of plate 30 is an inlet fitting 42 of a pressure regulating valve 44. Valve 44 includes body 46 in which is housed conventional pressure regulating mechanism which regulates the pressure of air discharged through an outlet opening 48. As is conventional, such valves include an exteriorily extending rotatable shaft 50 which is rotatable to afford adjustment of the pressure of the air delivered through outlet opening 48.

For connecting fittings to dome 34, the dome is provided with a plurality of bosses 52 circumferentially spaced therearound. As seen at 54 (FIG. 2), the dome is provided with tapped holes therethrough at the center of each boss 52.

Threadedly engaged in at least one hole 54 is a conventional spring-operated, quick-disconnect fitting 56 for affording connection of an air hose to the apparatus. Fitting 56 is a well-known device which, when not engaged with a complementary hose fitting, closes opening 54 through a valve mechanism interiorly of the fitting. Threadedly engaged in another hole 54 is a pressure release valve 58 which is set at a pressure only slightly higher than the pressure at which regulator valve 44 operates, thereby affording additional assurance that the pressure within the interior of dome 34 cannot reach an excessively high magnitude. Engaged in a third hole 54 is a conventional pressure gage 60 for providing a visual indication of system pressure.

Operation of the present invention can be more fully appreciated by considering an exemplary system suitable for providing adequate air for four workmen. In such system, compressed air is provided to air inlet 16 at about 125 lbs. per square inch (p.s.i.). Regulator valve 44 is adjusted at 25 p.s.i. by suitably positioning shaft 50. In such system, release valve 58 is adjusted at 26 p.s.i. so that the pressure within dome 34 is closely regulated. In the exemplary system, in which tank 12 has a diameter of approximately five inches and dome 34 has a similar diameter, 24 cubic feet of air per minute at 25 p.s.i. is delivered through valve 44 into the dome interior. Since typical safety requirements specify that a workman requires six cubic feet of clean air per minute, the exemplary system is adequate for supplying four workmen.

Because valve 44 is totally enclosed by dome 34 and because the dome is secured to tank 12 by plural bolts, eight in the structure depicted in the drawing, unauthorized tampering with valve 44 by rotation of shaft 50 is eliminated. However, access to the valve for repair or access to the tank for replacement of filter medium 18 is relatively easy because complete removal of the structure requires only the removal of eight bolts 38. Moreover, because plate 30 is separable from dome 34, substantially unobstructed access to valve 44 can be had on disassembly of the apparatus so that the valve can be cleaned, adjusted, and/or repaired.

It will be observed that the manifold and its accouterments are extremely compact as compared with prior art structures having a maze of pipe fittings. Because of such compactness of the manifold and its accouterments, the task of replacing filter medium 18 is greatly facilitated.

Thus it will be seen that the present invention provides an air distribution manifold for an air purifying filter, which assures compliance with safety regulations in that the pressure regulating valve is totally enclosed. Such advantageous construction is provided in a relatively uncomplex structure that is more compact than any known prior art devices. The compactness of the manifold expedites disassembly of the device, such as may be necessary for cleaning the apparatus or replacing the filter medium.

Although one embodiment of the invention has been shown and described, it will be obvious that other adaptations and modifications can be made without departing from the true spirit and scope of the invention.

What is claimed is:

1. An air purifying system comprising a generally cylindric tank having an air inlet fitting in the sidewall thereof, a circular outlet at one end thereof, and a circular flange concentrically circumscribing said outlet, means for supporting said tank in a generally vertical position with the flange and outlet at the top, a filter medium configured in cartridge form and having a mounting ring on the upper extremity thereof complementary with said flange, said flange and said mounting ring having plural equally spaced holes therethrough so that when said holes are in registry said filter medium is centrally positioned in said cylindric tank, a circular air impervious plate having a plurality of holes for alignment with the holes in said flange for aligning the plate across said circular opening, said plate having a threaded opening centrally thereof for establishing the sole air opening therethrough, a pressure regulating valve having an inlet fitting engaged in said opening, said regulating valve having extending therefrom a shaft that is rotatable to afford adjustment of the pressure at which the valve regulates air passing therethrough, a dome having a base flange therearound generally congruent to said tank flange and having holes therethrough for registry with holes in said tank flange, said dome being air impervious and adapted totally to cover said pressure regulating valve, said dome having a first opening and a pressure release valve in said first opening for limiting the pressure within said dome, a second opening and a pressure gage in said opening for indicating the pressure interior of said dome, and at least two third openings and quick disconnect fittings in said third openings to afford connection of air outlet lines to said dome, said quick disconnect fittings being adapted to close the opening with which they are associated when a hose is not connected thereto and being adapted to communicate air through said hose on connection of a hose thereto, and a plurality of threaded fasteners extending through the aligned holes in said dome flange, said circular plate, said cartridge mounting ring and said tank flange to hold the enumerated parts in operative assembly, said dome totally covering said pressure regulating valve and the rotatable shaft associated therewith to render inaccessible said valve and shaft.

2. The invention of claim 1 wherein the inlet fitting of said pressure regulating valve includes a 90° elbow and wherein said pressure regulating valve is attached to said elbow and extends diametrally of said dome, said dome being closely vertically spaced from said valve, whereby the height of said dome is minimized.

References Cited

UNITED STATES PATENTS

| | | | |
|---|---|---|---|
| 446,218 | 2/1891 | Hallwood | 55—503 X |
| 1,069,394 | 8/1913 | Cozzolino | 55—501 X |
| 1,215,974 | 2/1917 | Orem | 55—501 X |
| 1,735,441 | 11/1929 | Paffen et al. | 55—311 X |
| 1,918,614 | 7/1933 | Ruemelin | 55—312 |
| 1,939,151 | 12/1933 | Thompson | 55—417 |
| 1,961,445 | 6/1934 | McCormick | 55—504 X |
| 2,113,447 | 4/1938 | Hardinge | 55—417 |
| 2,643,944 | 6/1953 | Malir. | |
| 2,652,828 | 9/1953 | Matheson. | |
| 2,656,009 | 10/1953 | Kent | 55—347 |
| 2,703,153 | 3/1955 | Revoir et al. | 55—311 |
| 2,707,051 | 4/1955 | Mailhot et al. | 55—417 X |
| 3,302,375 | 2/1967 | Miller | 55—504 |

HARRY B. THORNTON, *Primary Examiner.*

FRANK W. LUTTER, *Examiner.*

D. TALBERT, *Assistant Examiner.*